United States Patent [19]

Shen et al.

[11] 4,081,417

[45] Mar. 28, 1978

[54] PROCESS FOR PREPARING WATER-DILUTABLE, HEAT-CURING COATING COMPOSITIONS

[75] Inventors: Kwan Ting Shen, Lakewood, N.J.; Timothy L. Pickering, Emmaus, Pa.

[73] Assignee: Ciba-Geigy Corporation, Ardsley, N.Y.

[21] Appl. No.: 764,121

[22] Filed: Jan. 31, 1977

Related U.S. Application Data

[63] Continuation-in-part of Ser. No. 589,505, Jun. 23, 1975, abandoned.

[51] Int. Cl.$^2$ .................. C08L 63/02; C08L 61/28
[52] U.S. Cl. .................. 260/29.2 EP; 260/29.2 E; 260/29.3; 260/29.4 R; 428/418; 428/460
[58] Field of Search .................. 260/29.2 EP, 29.4 R, 260/834, 849

[56] References Cited

U.S. PATENT DOCUMENTS

| 2,819,222 | 1/1958 | De Groote et al. | 260/570.6 |
| 3,538,033 | 11/1970 | Hayashi et al. | 260/29.2 |
| 3,673,558 | 6/1972 | Toepel | 260/29.2 EP |
| 3,840,483 | 10/1974 | Guldenpfennig | 260/29.2 EP X |
| 3,844,988 | 10/1974 | Jeffery et al. | 260/29.4 R |

FOREIGN PATENT DOCUMENTS 1,423,973  2/1976  United Kingdom.

Primary Examiner—Theodore E. Pertilla
Attorney, Agent, or Firm—Luther A. R. Hall

[57] ABSTRACT

A process for preparing water-dilutable, heat-curing coating compositions comprises (a) reacting an aromatic polyglycidyl ether with a compound containing an active hydrogen followed by the addition of ethylene oxide to form an adduct containing hydroxyl groups, (b) adding an aminoplast curing agent, and (c) diluting with water to give a stable aqueous composition.

The process gives compositions which are useful in preparing coatings for a wide variety of substrates obviating the need for organic solvents with their inherent costs and environmental hazards.

20 Claims, No Drawings

PROCESS FOR PREPARING WATER-DILUTABLE, HEAT-CURING COATING COMPOSITIONS

This is a continuation-in-part application of copending application, Ser. No. 589,505, filed June 23, 1975, now abandoned.

BACKGROUND OF THE INVENTION

The process of this invention pertains to the preparation of water-dilutable coating compositions.

Increasing concern about environmental and health hazards has given impetus to the search for processes to prepare acceptable coatings without the use of organic solvents. A practical, useful invention not only requires that the coating compositions be in an aqueous medium, but the resulting coatings after curing must be essentially equivalent in properties to coatings prepared from present organic solvent systems.

The process of this invention involves the preparation of water-dilutable coating compositions. The "water-dilutable" as used herein indicates the formation of compositions which contain organic solids that are colloidally dispersed in water with no particles being visible when the composition is viewed through an optical microscope. Particle sizes present in the compositions do not exceed 0.1 micron. Moreover, this water-dilutability of the compositions of this invention is accomplished without the aid of water-miscible organic cosolvents.

The water-dilutable compositions of the process of this invention are distinguished from water-soluble or wateremulsifiable compositions, but the terms "waterborne," "water-reducible" and "water-dispersable" may be used interchangeably with "water-dilutable" within the definitions of said process.

The advantages of such a water system are a reduction in fire hazards since flammable organic solvents are replaced by water, the lack of odors and noxious and toxic fumes to be controlled during the manufacture and subsequent use of the coating composition, the lack of need for an expensive solvent recovery system which would be mandated by both economic and ecological reasons, and the fact that high solids compositions can be used expeditiously without the coating compositions becoming viscous and difficult to apply evenly thus allowing faster line speeds in coatings operations.

Increasing concern about environmental and health hazards, as exemplified by the California Rule 66 ban on the release of organic vapors into the atmosphere and in recent OSHA regulations on banning undue exposure of workers to potentially toxic organic vapors often encountered in conventional coating operations, points to the need for replacing organic solvents in coating compositions with water dilutable systems. The compositions of this invention provide a practical means of preparing coatings based on epoxy and aminoplast curing agents, which are known to give good coating performance, in a new and desirable process using aqueous systems thereby totally circumventing the hazards to personnel and the environment inherent with the conventional processes using organic solvents.

The coatings prepared from the compositions of this invention are essentially comparable in physical properties, appearance, durability, clarity, toughness, adhesion, strength, impact resistance and the like to coatings prepared from conventional coating compositions in organic solvents. Surprisingly these cured coatings are also essentially as insensitive to water as coatings prepared from conventional organic solvent systems.

U.S. Pat. No. 2,819,222 discloses the process for breaking petroleum emulsions employing certain oxyalkylation products derived in turn from nitrogen-containing compounds and polyepoxides. The polyepoxide starting materials covered by this patent are limited to monomeric diepoxides from polyhydric phenols or to low molal members (not over the tetramer) of the series and the products may be free of hydroxy groups. This is stated as important in this patent because U.S. Pat. No. 2,819,222 is directed toward products which are not resins and have certain solubility characteristics not inherent in resins. In addition, the oxyalkylation reaction is taught as being carried out not only with ethylene oxide which would give water-dispersible materials, but also with propylene oxide and butylene oxide which would not give the water-dilutability required of the instant products.

The instant products are resins which must be converted into tough, durable coatings after appropriate heatcuring of the instant compositions, quite the opposite of the teachings of U.S. Pat. No. 2,819,222, and for purposes not contemplated or envisioned by said patent teachings.

U.S. Pat. 2,819,222 limits the starting epoxide compounds to materials having values of $n'$ of 0 to 3, preferably where $n'$ is 0. These materials correspond to epoxy resins of molecular weight from about 340 to about 1,192, preferably about 340. This limitation is required to prepare soluble materials having the claimed demulsifier activity. U.S. Pat. No. 2,819,222 clearly implies that when $n'$ is over 3, solubility (or water dilutability) no longer is attained.

It is known in the art that epoxy resins with molecular weights over 1,200, where $n'$ is over 3, can be used in making resinous products. U.S. Pat. No. 2,819,222 also teaches this, but clearly does not teach or suggest that such higher weight epoxy resins can be modified as in the instant process to yield water-dilutable compositions which are useful in preparing coatings having acceptable physical properties.

The products of U.S. Pat. No. 2,819,222 are indeed water-dilutable and cured coatings can be prepared therefrom. However, the properties of said coatings are unacceptable weight epoxy resins ($n'$ is 0 to 3) lead to films or coatings having unacceptable tackiness. This is a serious problem which must be avoided since it is customary to stack metal sheets coated with epoxy resin on top of one another. The stacked sheets are required to support appreciable weight without sticking together. The products of U.S. Pat. No. 2,819,222 fail to pass this critical requirement.

When epoxy resins of higher molecular weight (1,500 to 5,000, where $n$ is 4 to 17) are used in the instant process, tack-free coatings are obtained. Thus the instant invention is clearly differentiated from U.S. Pat. No. 2,819,222 both by the teachings of said patent and by the instant working Examples.

The instant compositions of this invention prefer that the poly(1,2-epoxide) starting material have significantly higher molecular weights, at least higher than the tetramer of the diepoxide monomer used so that ultimate coatings prepared from these water-reducible, heat-curing compositions will have practicably useful properties.

In the U.S. Pat. No. 2,731,444 the reaction of epoxy resins with polyhydric alcohols is taught to give compositions suitable as crosslinking reactants. There are disclosures of the reactions of epoxy resins with less than one equivalent of hydroxyl per epoxy group, with equivalent amounts of hydroxyl to epoxy group, but with incomplete reaction thereof, and of excess hydroxyl group per epoxy group. However, this patent does not teach or suggest the process of the instant invention.

While U.S. Pat. No. 2,731,444 teaches the reaction products of epoxy resins and polyhydric alcohols, including polyethylene glycol, can be further reacted with various polyfunctional crosslinking reactants through epoxy or hydroxy groups thereon and that the reaction products of epoxy resins with less than equivalent amounts of polyhydric alcohols are valuable coating compositions, it does not teach or suggest the process of this invention for the preparation of water-dilutable, heat-curable coating compositions nor does it lay down the critical limits required to achieve the instant process. In fact U.S. Pat. No. 2,731,444 teaches away from the instant process by broadly disclosing the reaction of epoxy resins and polyhydric alcohols without suggesting that water-dilutability is possible, let alone a desirable objective.

U.S. Pat. No. 2,951,778 teaches the use of the reaction product of poly(1,2-epoxide) with monomeric ethylene glycol at mole ratios of 2:1 to 1:2 to form a flexibilizer useful in epoxy resin formulations. Such as material would be insufficiently soluble in water to have any value in the water-dilutable process of this invention.

U.S. Pat. No. 2,947,717 teaches the use of a dihydric alcohol of molecular weight less than 600, including polyethylene glycol, in combination with a poly(1,2-epoxide) and a polycarboxylic acid anhydride for the preparation of crosslinked infusible resinous products made more fluid and hence easier to use before curing by the presence of dihydric alcohol. The various ingredients are mixed in the absence of solvent (organic or water) and heated until homogeneous at temperatures not over 80° C. Heating at 80°–200° C affects curing and crosslinking of this system as all three components interact with one another. This system would not be water-dilutable, in fact the presence of water would render it inoperable due to premature hydrolysis of the anhydride before curing.

The reaction of polyethylene glycol with an aromatic diepoxide is also taught in U.S. Patent No. 3,563,943 for the preparation of oxyethylene-containing non-ionic compounds useful as emulsifiers for urethane latices. This patent teaches that the polyethylene glycol must have a molecular weight of from about 5,000 to about 10,000 and be reacted with an aromatic diepoxide in a mole ratio of polyethylene glycol to aromatic diepoxide of at least 2:1. The non-ionic emulsifiers resulting have a molecular weight of from 12,000–24,000. The instant process is not suggested by this reference.

Detailed Disclosure

This invention pertains to the process for preparing water-dilutable, heat-curable coating compositions which comprises (a) reacting a polyepoxide, particularly an aromatic polyglycidyl ether, having a molecular weight in the range of 1,500 to 5,000 with an active hydrogen compound followed by the addition of ethylene oxide to form an adduct containing hydroxyl groups, (b) adding 5 to 50% by weight of solids of an aminoplast curing agent, and (c) diluting with water to bring the total percent solids in the range of 10 to 80% by weight and to yield a stable, aqueous composition containing no particles larger in size than 0.1 micron.

A water-dilutable composition is characterized in that the hydroxy-containing adduct and the aminoplast or phenoplast curing agent are in essentially an all-aqueous medium. The resulting composition can be further diluted with water, if required, as contrasted to conventional coating compositions where the solid materials are dissolved in an organic solvent and further dilution with water to give uniform stable compositions suitable for preparing useful coatings is not possible.

This invention relates to a process for preparing water-dilutable, heat-curing coating compositions which comprises (a) reacting a polyepoxide, particularly an aromatic polyglycidyl ether, having a molecular weight in the range of 1,500 to 5,000 with sufficient active hydrogen compound to the free epoxy groups followed by a second reaction with ethylene oxide to form a modified epoxy resin containing in the range of 10 to 90% by weight of grafted and ungrafted poly(ethylene oxide) and with less than 20% being ungrafted poly(ethylene oxide), (b) adding 5 to 50% by weight of solids of an aminoplast curing agent, and (c) diluting with water to bring the total percent solids in the range of 10 to 80% by weight and to yield a stable, aqueous composition containing no particles larger in size than 0.1 micron.

Taken in its broadest aspect, the process of this invention relates to the preparation of water-dilutable, heat-curing, coating compositions which comprises (a) reacting a polyepoxide, preferably an aromatic polyglycidyl ether, with an active hydrogen compound to form material essentially free of unreacted epoxy groups followed by reacting the product obtained thereby with ethylene oxide to form a product containing hydroxyl groups, (b) adding an aminoplast curing agent, and (c) diluting with water.

A preferred embodiment of the process of this invention comprises (a) first reacting an aromatic polyglycidyl ether prepared from 2,2-bis(4-hydroxyphenyl)propane and epichlorohydrin and having a molecular weight in the range of 1,500 to 2,000 and an epoxy equivalent weight of 750 to 1,000 with 2 molar equivalents of diethanolamine and then with sufficient ethylene oxide to ethoxylate the free hydroxyl groups first produced to give a modified product containing from 40 to 70% by weight of grafted poly(ethylene oxide) and less than 10% by weight of ungrafted poly(ethylene oxide), (b) adding an aminoplast curing agent, and (c) diluting with water.

The aromatic polyglycidyl ethers having a molecular weight in the range of 1,500 to 5,000 are available commercially as epoxy resins under a variety of trademarks such as "ARALDITE" 6084, 6097 and GT 7014 (CIBA-GEIGY), "Epon" 1004 and 1007 (Shell), "DER" 664 and 667 (Dow) and "Epi-Rez" 530 and 540 (Celanese).

The aromatic polyglycidyl ethers that can be used in this invention comprise those organic materials which have more than one vic-epoxy group, i.e., more than one

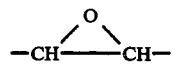

group, which group is in a terminal position, i.e.,

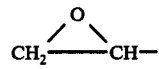

The polyepoxides useful in the process of this invention are derived from polyhydric phenols, preferably dihydric phenols, and may be substituted with substituents, such as chlorine, bromine, hydroxyl group, ether radicals, and the like.

The polyepoxides comprise a relatively large class of materials and have been described in numerous patents such as U.S. Pat. Nos. 2,467,171, 2,615,007, 2,716,123, 3,030,336, 3,053,855, 3,075,999 and 3,624,180.

Epoxy polyethers are often prepared by reactions of a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl)-butane, bis(4-hydroxyphenyl)methane(bis-phenol F), 4,4'-dihydroxybenzophenone, bis(4-hydroxyphenyl)ethane, 2,2-bis(4-hydroxyphenyl)pentane and 1,5-dihydroxynaphthalene. By varying the ratios of the phenol and epichlorohydrin one obtains different molecular weight products as shown in U.S. Pat. No. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° to 150° C. The heating is continued for several hours to complete the reaction and the product is then washed free of salt and base.

The preparation of glycidyl polyethers of dihydric phenols is illustrated in U.S. Pat. Nos. 2,582,985, 2,615,007 and 2,633,458.

Polyepoxides having an average molecular weight between 1,500 and 5,000 are useful in the process of this invention with polyepoxides having an average molecular weight between 1,500 and 2,000 being particularly preferred. Although water dilutability can be achieved with lower molecular weight epoxy resins, coatings and films prepared from systems having an epoxy resin molecular weight below 1,500 exhibit tackiness which is unacceptable.

Preferably the aminoplast curing agent is selected from the group consisting of urea-formaldehyde resins, melamine-formaldehyde resins, hexamethoxymethylmelamine and other nitrogen resin precursors. The amount of said aminoplast curing agent in the composition is 5 to 50% by weight of solids, and is preferably 15 to 40% by weight of solids.

Most preferably the aminoplast curing agent is a methylated urea-formaldehyde resin available commercially as "Beetle 65" from American Cyanamid, a methoxy methyl melamineformaldehyde resin available commercially as "Uformite MM-83" from Rohm and Haas or a nitrogen resin precursor, hexamethoxymethylmelamine available commercially as "Cymel 303" from American Cyanamid. The amount of said aminoplast curing agent in the composition is most preferably 20 to 30% by weight of solids.

The instant compositions are water-dilutable and yield stable, uniform compositions over a wide range of aqueous system concentrations from 10 to 80% solids by weight. Preferably the percent solids concentration range is 30 to 70% by weight and most preferably 40 to 60% by weight.

The aromatic polyglycidyl ethers useful in the process of this invention are epoxy resins having an average molecular weight in the range of 1,500 to 5,000 or an average epoxy equivalent weight of 750 to 2,500. These aromatic glycidyl ethers are prepared by the glycidylation of polyhydric phenols using epichlorohydrin and alkali. Among the dihydric phenols which may be used to prepare the aromatic polyglycidyl ethers suitable for use in the process of this invention are: 2,2-bis(4-hydroxyphenyl)propane, 2,2-bis(3-bromo-4-hydroxypheyl)propane, 2,2-bis(3,5-dichloro4-hydroxyphenyl)propane, 2,2-bis(3-chloro-4-hydroxyphenyl)propane, bis(4-hydroxyphenyl)methane, bis(4-hydroxyphenylsulfone, bis(4-hydroxyphenyl)sulfide, resorcinol and hydroquinone. The preferred dihydric phenols are 2,2-bis(4-hydroxyphenyl)propane (bis-phenol A) and bis(4-hydroxyphenyl)methane (bis-phenol F). Most preferred is 2,2-bis(4-hydroxyphenyl)propane for reasons of cost and commercial availability.

Two criteria must be met by the process of this invention for operability. These are: (1) the composition prepared by the process must be water-dilutable, essentially in the absence of any added water-miscible, organic cosolvent to yield a stable, aqueous system containing no particles larger in size than 0.1 micron; (2) the coatings prepared from such an aqueous system must be essentially equivalent in properties to epoxide coatings prepared from organic solvent systems. That is the coatings made from the compositions of the process of this invention must not have unacceptable flaws directly related to the use of water as the coating composition medium or to individual components in the hydroxycontaining adduct prepared in the first step of the process.

As described earlier, modified epoxy resins having the epoxy resin molecular weight between 340 and 1,192 (where $n'$ is 0 − 3) are known in U.S. Pat. No. 2,819,222 to be useful as soluble, demulsifiers. When coatings were prepared from such modified epoxy resins, wherein the epoxy resin has a molecular weight up to 1,250, the coatings were unacceptable due to excessive tack clearly associated with the low molecular weight of the epoxy resin. When the epoxy resin molecular weight was 1,500 to 5,000, the coatings made from such systems exhibited no undesirable tackiness.

Preferably the aromatic polyglycidyl ether should have a molecular weight of about 1,500 to 2,000.

The modified aromatic polyglycidyl ethers or epoxy resins containing hydroxyl groups and being substantially free of unreacted epoxy groups are required in the process of this invention and are prepared as outlined below:

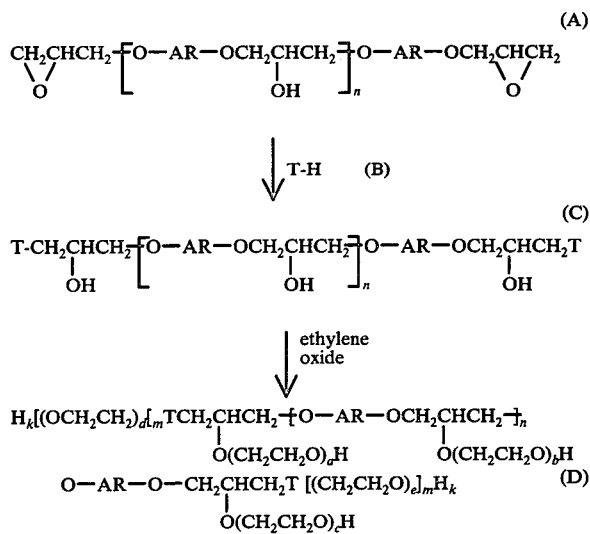

The starting aromatic polyglycidyl ether or epoxy resins are exemplified by formula A, where $n$ is an integer from 4 to 17, preferably from 4 to 6. AR denotes an aromatic divalent radical derived from polyhydric phenols such as 2,2-bis(4-hydroxyphenyl)propane, resorcinol, hydroquinone, 2,2-bis(3-bromo-4-hydroxyphenyl)propane and the like. The preferred polyhydric phenols are 2,2-bis(4-hydroxyphenyl) propane (i.e., bis-phenol A) and bis(4-hydroxyphenyl)methane. Most preferred is bis-phenol A.

The aromatic polyglycidyl ether of formula A is first reacted with sufficient active hydrogen compound of formula B to react with substantially all of the epoxide groups present. T represents the organic radical produced after the active hydrogen atom reacts with the epoxide group of the compound of formula A. The active hydrogen compounds of formula B comprise a broad spectrum of organic compounds selected from the groups consisting of amines, alcohols, acids, amides, phenols, thiols and polyfunctional moieties containing more than one of the same or different functionalities such as aminoalcohols, hydroxyacids, glycols, urea, melamines and the like.

Examples of useful materials from these classes include, but are not limited to, the following:

amines — ethylamine, diethylamine, piperidine, morpholine, aniline, imidazoline, imidazole and dimethylamine;
alcohols — methanol, ethanol, isopropanol, n-butanol, cyclyhexanol, 2-ethylhexanol and the mono ethers of ethylene glycol or diethylene glycols.
phenols — phenol, cresol and xylenol;
thiols — ethyl mercaptan, thiophenol, butyl mercaptan and methyl mercaptan;
acids — acetic acid, hydrogen chloride, benzoic acid, sulfuric acid, phosphoric acid and formic acid;
amides — acetamide and benzenesulfonamide.
polyfunctional materials — aminoalcohols, thioalcohols, glycols, hydroxy acids, diamines, polyamides, amino acids, thio acids, hydroxy ethers, bisphenols, aminophenols and mercapto acids. These would include - diethanolamine, 1,1'-imino-di-2-propanol, ethanolamine, ethylene glycol, diethylene glycol, polyethylene glycol, propylene glycol, hydroxyacetic acid, p-hydroxybenzoic acid, alanine, piperazine, ethylenediamine, hydroquinone, resorcinol, catechol, 2,2-bis(4'-hydroxyphenyl)propane or bisphenol A, p-aminophenol, mercaptoacetic acid, 2-mercaptoethanol, thiosalicylic acid, urea, thiourea, melamine, biguanides, cyanuric acid, dicyandiamide, uracil and benzoguanamine.

Preferably the active hydrogen compounds are amines, buch as diethylamine, piperidine, morpholine, dimethylamine; alcohols, such as 2-(2'-ethoxyethoxy)ethanol, monoalkylethers of ethylene glycol, diethylene glycol or triethylene glycol; and aminoalcohols, such as ethanolamine, diethanolamine, 1,1'-iminodi-2-propanol and the like.

Most preferred active hydrogen compounds are the aminoalcohols, with primary or secondary amine groups, such as diethanol amine, ethanolamine and 1,1'-iminodi-2-propanol which provide for ready reactivity of the amine functionality with the epoxide group and concomitantly provide additional free primary hydroxyl groups for subsequent reaction sites for adding ethylene oxide moieties in the second step of the process. Especially preferred is diethanolamine for reasons of cost, availability and particular functionality.

Formula D exemplifies the modified aromatic polyglycidyl ether or epoxy resin following the second step reaction with ethylene oxide. The formula D is useful for illustrative purposes only and the products of this process are not limited to those so illustrated.

In formula D, $n$ again is 4 to 17 and preferably 4 to 6. Groups Ar and T are as previously defined. The value of $m$ is 0 to 3 depending on the number of active sites remaining for ethoxylation (by addition of ethylene oxide) in the active hydrogen material T-H after its prior reaction with the epoxide group in the compound of formula A. When $m$ is 0, $d$ And $e$ are 0 and $k$ is 1. When $m$ is 1 to 3, $k$ is 1 to 3, $d$ and $e$ are 1 or higher, and $a$, $b$, $c$, $d$ and $e$ together are independently are 15 to 100.

Some preferred embodiments of the product exemplified by formula D where $n$ is 4 to 17, AR is

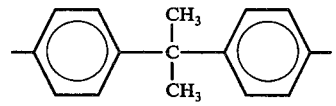

T is $-(OCH_2CH_2)N-$ where m is 2
            $_2$

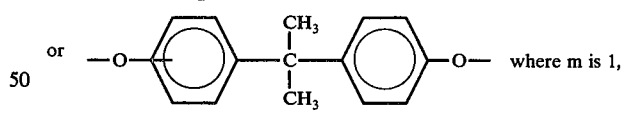

$k$ is 1 to 2, $d$ And $e$ are together, and independently 15 to 80, $a$, $b$ and $c$ are together and independently 0 to 5. Most preferably $d$ and $e$ are together and independently 25 to 70.

The first reaction step is carried out by dissolving the poly(1,2-epoxide) of formula A in an inert solvent, adding the active hydrogen-containing material of formula B and heating under nitrogen for a period of 1 to 5 hours at the reflux temperature of the solvent, usually from 70° to 160° C. Useful inert solvents are ketones such as methyl ethyl ketone and especially ethers such as 1,4-dioxane, 1,2-dimethoxyethane, diethylene glycol diethyl ether and the like.

The product of formula C is then further reacted in the second step with ethylene oxide to prepare the modified epoxy resin of formula D containing hydroxyl groups and being substantially free of unreacted epoxy groups and containing grafted and ungrafted poly(ethylene oxide) in the range of 10 to 90% by weight.

The preferred product of the second reaction step is a modified epoxy resin exemplified by formula D and having a grafted poly(ethylene oxide) content in the range of 35 to 75% by weight and most preferably 40 to 70% by weight.

This second step reaction of materials of formula C with ethylene oxide is conveniently carried out in the absence of oxygen at elevated temperatures of 100° to 200° C, preferably at 135° to 165° C, for periods of 2 to 8 hours, preferably for a period of 3 to 5 hours, in the presence of an inert solvent, such as the ethers or ketones used in the preparation of the materials of formula C, and in the presence of a basic catalyst such as a powdered alkali metal hydroxide, metallic sodium, an alkali metal amide or an alkali metal alkoxide. It is not necessary to isolate the product of the first step, namely, material of formula C, before proceeding with the second step reaction with ethylene oxide.

During the second step graft polymerization of ethylene oxide onto active sites in product of formula C, some homopolymer of ethylene oxide is sometimes formed in amounts ranging from 5 to 25% by weight. The presence of this homopolymer of ethylene oxide in the final product of formula D and in the water-dilutable, heat-curing compositions of this invention does not render the compositions inoperable or non-useful particularly when the amount of the homopolymer is less than 10%. In this case there are no discernible effects on the quality of performance of the coatings prepared from the water-dilutable compositions.

When the amount of homopolymer of ethylene oxide hs over 20% by weight in the product of formula D, there was a tendency of the cured coatings made from the composition of this invention to exhibit some tackiness. Extraction of the product of formula D containing this high level of homopolymer of ethylene oxide with water reduced the concentration of the homopolymer to values under 10%, preferably under 5% by weight in the product of formula D that is incorporated into the compositions of this invention. Example 45 shows the procedure by which the homopolymer of ethylene oxide can be removed from the products of formula D. Coatings prepared from compositions of formula D after the water treatment described in Example 45 exhibited good physical properties without any undesired tackiness after heat-curing.

The urea-formaldehyde and melamine-formaldehyde aminoplast curing agents are commercially available, e.g., respectively "Beetle 65" of American Cyanamid, "Beckamines" of Reichhold Chemicals and the "Uformite MM-83" of Rohm and Haas and "Cymel 300" of American Cyanamid. The latter is a hexamethoxymethylmelamine material largely monomeric in structure while the other materials cited are oligomeric or polymeric in nature.

Some curing agents employed in this invention are nitrogen-containing resin precursors particularly those capable of being insolubilized at acid pH values and which act as crosslinking agents under acid conditions. These resin precursors urea-formaldehyde type resins and the substituted cyclic triazines. Suitable groups of resin precursors include dimethylol and polymethylol derivatives of urea, N,N'-ethylene urea, N,N'-propylene urea, dihydroxyethylene urea, thiourea, dicyandiamide, guanidine, esters of carbamic acid, methylolated aminotriazines and methylolated triazines as well as their etherification products. Other useful precursors include 1,3-bis(hydroxymethyl)-2-imidazolidinone Nr dimethylolethyleneurea, $N^2,N^4,N^6$-tris(hydroxymethyl)melamine, hexahydro-1,3,5,-tris(3'-methoxypropionyl)-s-triazine, benzoguanamine, ammeline, 4,6-diaminopyrimidine, acetoguanamine, melamine, benzyl urea, 3,5-diamino-triazole, diazine diamide and the like.

The aminoplast curing agents employed in this invention include the reaction products of an aldehyde with the nitrogen compounds listed above. The aldehydes that can be used conveniently include formaldehyde, acetaldehyde, paraformaldehyde, trioxane, crotonaldehyde, acrolein, benzaldehyde and furfural. The preferred nitrogen compounds are melamine and urea and the preferred aldehyde is formaldehyde.

These aldehyde condensation products contain methylol groups or similar alkylol groups depending on the aldehyde used. It is often desired to etherify the methylol group by reaction with a monohydric alcohol. While any monohydric alcohols can be used, the preferred alcohols are methanol, butanol, ethanol, pentanol, hexanol or octanol.

The amine-aldehyde condensation products are produced in a manner well known in the art, using acidic or basic catalysts and varying conditions of time and temperature. The aldehyde is often employed as a solution in water or alcohol and the condensation polymerization and etherification reactions may be carried out either sequentially or simultaneously. The reaction is usually effected in the usual formaldehyde:urea resins mol proportion of 1:1.5 to 1.4 and formaldehyde:melamine resins of 1:1.5 to 1.6. The aminoplast is preferably used in partially or completely etherified form. One preferred aminoplast used in this invention is hexamethoxymethyl melamine.

The aminoplast resins are blended with the hydroxy-containing materials of this invention in amounts ranging from 5 to 50 percent by weight based on the total weight of the solids.

In some cases acid catalysts, such as p-toluene sulfonic acid, cyclohexanesulfamic acid, butyl acid phosphate and phosphoric acid, can be added to blends of aminoplast or phenolplast and hydroxy-containing materials of this invention to increase the rate of the curing reaction, producing films or coatings that will cure at a lower temperature or in a shorter time. Up to 2 percent by weight of such acid Batalysts based upon the total weight of the solids have been found to be advantageous in some instances. Polycat, a cyclamic acid, has proven to be particularly useful.

Coatings compositions prepared from a hydroxy-containing material of this invention with an aminoplast or phenolplast can be applied to a substrate by conventional means such as brushing, spraying, dipping and roller-coating. The coatings are cured by heating at 100° to 250° C for a time sufficient to effect a cure, such times generally being from about five minutes to about one hour.

Other curing agents which may be employed in the process of this invention are phenoplast resins which include etherified resols of phenolic resins, formaldehydephenol carboxylic acid resins and phenolic resin precursors.

The following examples are illustrative of the invention, but are not meant to limit the scope of the same in any fashion whatsoever.

EXAMPLE 1

Reaction Product of an Epoxy Resin with an Active Hydrogen Compound

To a one-liter resin flask equipped with a mechanical stirrer, reflux condenser and heating bath was charged 250 grams of epoxy resin produced from 2,2-bis(4'-hydroxyphenyl)propane and epichlorohydrin and having an epoxy equivalent weight of 875 to 1,025 and a molecular weight of about 1,950 and 625 ml of 1,2-dimethoxyethane. The mixture was stirred until it was homogeneous. Then 27.5 grams of diethanolamine was added, the mixture was heated to reflux and held for one hour. On cooling a hazy solution resulted.

The solvent was removed from the solution of the product by vacuum distillation and the residual, brittle, amber solid was vacuum dried for 18 hours at 100° C. An aliquot sample was removed for analysis and gave a hydroxyl value of 5.60 equivalents per kilogram compared to a theoretical value of 5.46 equivalents per kilogram for the modified epoxy resin reaction product.

Additional reaction products were prepared using the procedure of Example 1 by reaction of the epoxy resin of Example 1 with other active hydrogen compounds as seen in Table I.

TABLE I

| Example Number | Active Hydrogen Compound | Solvent Used In Reaction | Product Characteristics |
|---|---|---|---|
| 2 | diethanolamine | dioxane | Clear yellow soln |
| 3 | diethanolamine | methyl ethyl ketone | Clear yellow soln |
| 4 | diethylamine | 1,2-dimethoxyethane | Clear yellow soln |
| 5 | 1,1'iminodi-2'-propanol | 1,2-dimethoxyethane | Clear yellow soln |
| 6 | diethylene glycol monoethyl ether (with 2.3 grams of boron trifluoride etherate catalyst) | 1,2-dimethoxyethane | Clear amber soln |

EXAMPLE 7

To a 250-ml, three-necked flask fitted with a mechanical stirrer, reflux condenser and heating bath was charged 100 grams of epoxy resin produced from 2,2-bis(4'-hydroxyphenyl)propane and epichlorohydrin and having an epoxy equivalent weight of 875 to 1,025 and a molecular weight of about 1,950 and 23.3 grams of 2,2'-bis(4'-hydroxyphenyl)propane (Bisphenol A). The mixture was heated to 150°-160° C under nitrogen and held at that temperature for five hours. On cooling, a brittle yellow solid was obtained. Titration of a sample gave a hydroxyl value of 4.17 equivalents per kilogram compared to a theoretical value of 3.94 equivalent per kilogram.

EXAMPLE 8

A modified epoxy resin was prepared as described in Example 1 except that the epoxy resin reacted was replaced by an equivalent amount of an epoxy resin produced from 2,2-bis(4'-hydroxyphenyl)propane and epichlorohydrin and having an epoxy equivalent weight of 2,100 to 2,500 and a molecular weight of about 5,000.

EXAMPLE 9

A modified epoxy resin was prepared according to Example 8 except that the solvent 1,2-dimethoxyethane was replaced by an equivalent amount of dioxane.

EXAMPLE 10

A modified epoxy resin was prepared as described in Example 2 except that the epoxy resin reacted was replaced by an equivalent amount of an epoxy resin produced from 2,2-bis(4'-hydroxyphenyl)propane and epichlorohydrin and having an epoxy equivalent weight of 714 to 800 and a molecular weight of about 1,500.

EXAMPLE 11

A modified epoxy resin was prepared as described in Example 1 except that the epoxy resin reacted was replaced by an equivalent amount of an epoxy resin produced from 2,2-bis(4'-hydroxyphenyl)propane and epichlorohydrin and having an epoxy equivalent weight of 550 to 700 and a molecular weight of about 1,250. (See Example 65)

EXAMPLE 12

A modified epoxy resin was prepared as described in Example 1 except that the epoxy resin reacted was replaced by an equivalent amount of an epoxy resin produced from 2,2-bis(4'-hydroxyphenyl)propane and epichlorohydrin and having an epoxy equivalent weight of about 980.

EXAMPLE 13

A modified epoxy resin was prepared as described in Example 1 except that the epoxy resin reacted was replaced by an equivalent amount of an epoxy resin produced from 2,2-bis(4'-hydroxyphenyl)propane and epichlorohydrin and having an epoxy equivalent weight of 450 to 530 and a molecular weight of about 1,000. (See Example 65)

EXAMPLE 14

A modified epoxy resin was prepared by the general procedure of Example 1. An epoxy resin (402 g; 0.27 m) produced from 2,2-bis(4-hydroxyphenyl)propane and epichlorohydrin and having an epoxy equivalent weight of 714 to 800 and a molecular weight of about 1,500 was dissolved in 460 grams of diethylene glycol diethyl ether and then treated with two molar equivalents (59.5 g; 0.55 m)of diethanolamine. The solution was maintained at 100°-110° C for 1 hour to effect the complete reaction. A clear, viscous yellow solution was obtained on cooling to room temperature.

EXAMPLE 15

Graft Polymerization of Ethylene Oxide on Modified Epoxy Resins

To a 300-ml stainless steel, bench-top autoclave equipped with a stirrer, nitrogen inlet and vacuum line was charged 25 grams of the modified epoxy resin prepared in Example 1 dissolved in 100 ml of 1,2-dimethoxyethane along with 0.3 gram of pulverized potassium hydroxide. (The solution of modified epoxy resin prepared in Example 1 may be used directly without isolation of the resin.) The autoclave was sealed, evacuated and flushed with nitrogen. This cycle was repeated three times before final evacuation. The contents of the autoclave were cooled to 0° C using an exterior ice-brine bath whereupon 24.0 grams of ethylene oxide was allowed to condense into the reactor from a lecture bottle container. The autoclave was sealed, then heated to 135° C and held at that temperature for three hours. After cooling, the autoclave was opened and the liquid contents were filtered through a Seitz pressure filter. The 1,2-dimethoxyethane solvent was then stripped off using a rotary evaporator to yield 21.0 grams of a yellow, very viscous liquid.

Analysis showed that only 25% of the available ethylene oxide was consumed under the above reaction conditions. The product obtained was not miscible with water. The amount of ethylene oxide grafted on the modified epoxy resin was 19% by weight.

EXAMPLE 16

In order to determine the structure of the various compositions of this invention and to determine how much ethylene oxide was grafted onto the modified epoxy resin, analysis of all products by NMR spectroscopy was carried out. This technique proved to be a simple and convenient means for determining the structures of the various materials.

Spectra were determined in $CDCl_3$ solvent with tetramethylsilane as the internal standard on a Varian HR 100 spectrometer. The appearance of respresentative types of spectra are described below:

---

Epoxy resin used in Example 1
1.25 ppm, (impurity peak)

1.60 ppm, singlet (—C—) with $CH_3$ groups 2.80 ppm, multiplet (—CH$_2$—CH$_2$—) with epoxide O 3.30 ppm, multiplet (—O—CH$_2$—CH—CH$_2$) with epoxide O 4.10 ppm, narrow multiplet (—O—CH$_2$CH—CH$_2$—O—) with OH 6.95 ppm, AB quartet (aromatic protons)

Modified resin prepared in Example 1
1.25 ppm, singlet (impurity peak)

1.60 ppm, singlet (—C—) with $CH_3$ groups 2.80 ppm, triplet (—NCH$_2$CH$_2$OH)
4.10 ppm, narrow multiplet (—OCH$_2$CHCH$_2$—O— with OH)

plus —N—CH$_2$CH$_2$OH)
6.95 ppm, AB quartet (aromatic protons)

Ethylene oxide graft copolymer made in Example 17
1.25 ppm, singlet (impurity peak)

1.60 ppm, singlet (—C—) with $CH_3$ groups 2.80 ppm, triplet (—NCH$_2$CH$_2$OH)
3.65 ppm, broad singlet (—OCH$_2$CH$_2$O—
4.1 ppm, narrow multiplet (—OCH$_2$CHCH$_2$O— with OH)

plus —N—CH$_2$CH$_2$OH)
6.95 ppm, AB quartet (aromatic protons)

---

By determining the integral ratio of the 3.65 ppm and 6.95 ppm peaks, it is possible to estimate the amount of ethylene oxide present per polymer repeat unit. This value must be corrected for the amount, if any, of ethylene oxide homopolymer present to arrive at a true value for the amount of ethylene oxide chemically bonded to the modified epoxy resin intermediate product as prepared in Examples 1–14.

To determine whether there is any homopolymer of ethylene oxide present, an aliquot (10 gram) portion of product was taken up in methylene chloride, extracted three times with water, dried over magnesium sulfate and filtered. The solvent was removed under vacuum and the residual solid material analyzed for percent ethylene oxide chemically combined. Any homopolymer of ethylene oxide formed was extracted in the water washes. The difference in weight between the original aliquot sample and residual solid obtained after removal of methylene chloride solvent is the weight of homopolymer in the original product.

EXAMPLE 17

Using the same procedure described in Example 15 except that the 300-ml bench-top autoclave was replaced by a 4,000-ml stainless steel, low pressure autoclave reactor fitted with a stirrer, nitrogen inlet, evacuation line and recirculating pump, 181 grams of modified epoxy resin made in Example 1 dissolved in 500 ml of 1,2-dimethoxyethane was reacted with 145 grams of ethylene oxide in the presence of 2.0 grams of pulverized potassium hydroxide. The reaction was run for five hours at 165° C and yielded 314.0 grams of a dark brown, highly viscous product which contained 31% by weight of grafted ethylene oxide and was diluted by water in all proportions.

Epoxy resins modified by reaction with diethanolamine as the active hydrogen-containing material were further reacted with ethylene oxide to form a product on which polyethylene oxide was graft polymerized. In some cases, a quantity homopolymer of ethylene oxide was also formed. The homopolymer could be removed from the desired product by the aqueous extraction of a solution of the desired product in an organic solvent.

In the following Table II are listed additional examples of the graft polymerization reaction carried out on the diethanolamine modified epoxy resins of varying molecular weight as indicated by the value of $n$ in formula D depicting the original epoxy resin employed.

In examples 37 and 38, the powdered potassium hydroxide catalyst was replaced by an equivalent amount of metallic sodium.

The same epoxy resin modified in Example 1 with diethanolamine was modified with diethylamine in Example 4, diethylene glycol monoethyl ether in Example 6 and with 2,2-bis(4'-hydroxyphenyl)propane or bisphenol A in Example 7.

These modified epoxy resins were subsequently further reacted with ethylene oxide as described in Examples 15 and 17 to prepare a modified epoxy resin on which polyethylene oxide was grafted. In some cases, the product as obtained contained a small amount of the homopolymer of ethylene oxide.

TABLE II

| Example Number Epoxy Resin Modified By Diethanol- | Value Of n in Formula D Original | Total % Ethylene Oxide In | % Homo-Polymer Of Ethylene Oxide | Product Water- | Solvent | Reaction Conditions Cond. Of | Temp. | Time |
| --- | --- | --- | --- | --- | --- | --- | --- | --- |

TABLE II-continued

| Example | Amine | Epoxy Resin | Product | Present | Dilutable | Used | Example | (° C) | (hours) |
|---|---|---|---|---|---|---|---|---|---|
| 15 | 1 | 5.5 | 19 | — | No | 1,2-Dimethoxyethane | 15 | 135 | 3 |
| 17 | 1 | 5.5 | 31 | — | Yes | 1,2-Dimethoxyethane | 17 | 165 | 5 |
| 18 | 1 | 5.5 | 24 | — | No | 1,2-Dimethoxyethane | 15 | 135 | 3 |
| 19 | 1 | 5.5 | 47 | 15 | Yes | 1,2-Dimethoxyethane | 17 | 160 | 6 |
| 20 | 1 | 5.5 | 43 | — | Yes | 1,2-Dimethoxyethane | 15 | 125 | 8 |
| 21 | 1 | 5.5 | 45 | — | Yes | 1,2-Dimethoxyethane | 17 | 150 | 3 |
| 22 | 1 | 5.5 | 51 | — | Yes | 1,2-Dimethoxyethane | 17 | 165 | 5 |
| 23 | 1 | 5.5 | 53 | — | Yes | 1,2-Dimethoxyethane | 17 | 160 | 5 |
| 24 | 1 | 5.5 | 54 | — | Yes | 1,2-Dimethoxyethane | 15 | 125 | 2 |
| 25 | 1 | 5.5 | 56 | — | Yes | 1,2-Dimethoxyethane | 15 | 130 | 5 |
| 26 | 2 | 5.5 | 65 | 16 | Yes | Dioxane | 15 | 150 | 5 |
| 27 | 2 | 5.5 | 66 | 20 | Yes | Dioxane | 15 | 150 | 5 |
| 28 | 3 | 5.5 | 34 | — | No | Methyl Etyl Ketone | 15 | 140 | 5 |
| 29 | 8 | 16.4 | 54 | — | No | 1,2-Dimethoxyethane | 15 | 160 | 4 |
| 30 | 8 | 16.4 | 58 | 20 | Yes | 1,2-Dimethoxyethane | 15 | 140 | 3 |
| 31 | 8 | 16.4 | 66 | 18 | Yes | 1,2-Dimethoxyethane | 15 | 155 | 5 |
| 32 | 8 | 16.4 | 72 | — | Yes | 1,2-Dimethoxyethane | 17 | 150 | 5 |
| 33 | 10 | 4.0 | 31 | — | No | 1,2-Dimethoxyethane | 15 | 190/ 4 | |
| 34 | 10 | 4.0 | 54 | 18 | Yes | 1,2-Dimethoxyethane | 15 | 155 | 5 |
| 35 | 11 | 4.0 | — | — | Yes | 1,2-Dimethoxyethane | 15 | 150 | 5 |
| 36 | 12 | 4.0 | — | — | Yes | 1,2-Dimethoxyethane | 15 | 150 | 5 |
| 37 | 14 | 4.0 | 35 | — | No | Dietyl Carbitol | 17 | 150 | 3 |
| 38 | 14 | 4.0 | 45 | — | Yes | Diethyl Carbitol | 17 | 155 | 4.5 |

| Example | Example Number Modified Epoxy Resin | Value Of n in Formula D Original Epoxy Resin | Epoxy Resin Modifier | Total % Ethylene Oxide In Product | % Homopolymer Ethylene Oxide Present | Product Water-Dilutable | Like Example | Temp. (° C) | Time (hours) |
|---|---|---|---|---|---|---|---|---|---|
| 39 | 4 | 5.5 | Dietyulamine | 22 | — | No | 15 | 150 | 5 |
| 40 | 6 | 5.5 | Diethylene glycol monoethyl ether | 43 | — | No | 15 | 150 | 5 |
| 41 | 6 | 5.5 | Diethylene glycol monoethyl ether | 49 | 25 | Yes | 15 | 150 | 5 |
| 42 | 7 | 5.5 | Bisphenol A | 51 | 9 | Yes | 15 | 150 | 5 |
| 43 | 7 | 5.5 | Bisphenol A | 58 | 7 | Yes | 17 | 160 | 5 |
| 44 | 7 | 5.5 | Bisphenol A | 60 | 8 | Yes | 15 | 150 | 5 |

EXAMPLE 45

Preparation of a Product Substantially Free of Homopolymer of Ethylene Oxide

Following the procedure of Example 14, a 50% solids solution of epoxy resin, modified by reaction with diethanolamine, in diethyl carbitol (diethylene glycol diethyl ether) was prepared. 520 grams of this 50% solution was charged into a stainless steel reactor along with 1.05 grams of metallic sodium catalyst. The mixture was circulated at 150° C through a spray nozzle and 260 grams of ethylene oxide was added at 20 mm pressure and reacted over a 4.5 hour period. The product solution was distilled and stripped with nitrogen gas at 110° C and 20 mm pressure until the percent volatiles content was less than 0.5%.

The viscous product was then extracted with three parts of water once at 70°-80° C followed by stripping at 120° C/20mm to give an 80% yield of viscous product essentially free of homopolymer of ethylene oxide.

EXAMPLE 46

A formulation suitable for coating applications on various substrates was prepared by mixing 28.3 grams of the product of Example 45 with 12.2 grams of a methylated urea-formaldehyde resin with a Gardner-Holdt viscosity at 25° C of 23-26, commercially available as Beetle 65, in 59.5 grams of deionized water. The urea-formaldehyde resin acts as a curing agent in the formulation. The formulation had an initial viscosity of 41.7 seconds, a solids content of 40.5 percent, no organic solvent, product:curing agent ratio of 70:30 and pH of 9.4. The formulation had a Gardner 212 appearance color value of 7. No catalyst was present in the formulation.

The formulation was thoroughly mixed by use of a commercial paint shaking machine (Red Devil Paint Shaker).

The aqueous formulation was stable at room temperature.

EXAMPLE 47

A formulation suitable for coating applications on various substrates was prepared by mixing 23.1 grams of the product of Example 45 with 12.4 grams of a methoxy methyl melamine-formaldehyde resin 80 ± 2% solids solution in isopropanol:isobutanol (1:1) with a Gardner-Holdt viscosity at 25° C of T to Z, commercially available as "Uformite MM-83," in 64.5 grams of water. The melamine-formaldehyde resins act as a curing agent in the formulation. The formulation had an initial viscosity of 50.6 seconds, a solids content of 33 percent, an organic solvent content of 2.5 percent (1:1, isopropanol:isobutanol), product:curing agent ratio of 70:30 and a pH of 9.3. The formulation had a Gardner 212 appearance color value of 7. No catalyst was present in the formulation.

The formulation was thoroughly mixed by use of a commercial paint shaking machine (Red Devil Paint Shaker).

The aqueous formulation was stable at room temperature.

EXAMPLE 48

A formulation suitable for coating applications on various substrates was prepared by mixing 28.8 grams of the product of Example 45 with 5.1 grams of hexamethoxymethylmelamine with a Gardner-Holdt viscosity at 25° C of X-Z2 and an equivalent weight of 130-190, commercially available as "Cymel 303," and 0.5 grams of a catalyst, Curing Agent C (American Biosynthetics) 28.7% solids in water, in 65.6 grams of water. The hexamethoxymethylmelamine acts as the curing agent in the formulation with the addition of 1.5% (on resin solids) of the catalyst. The formulation had an initial viscosity of 39 seconds, a solids content of 34 percent, no organic solvent, product:curing agent ratio of 85:15 and a pH of 9.6. The formulation had a Gardner 212 appearance color value of 8.

The formulation was thoroughly mixed by use of a commercial paint shaking machine (Red Devil Paint Shaker).

The aqueous formulation was stable at room temperature.

EXAMPLE 49

A formulation was prepared according to the directions of Example 48 with 33.9 grams of the product of Example 45, 5.9 grams of hexamethoxymethylmelamine, "Cymel 303," curing agent, 0.08 grams of a catalyst, Curing Agent C and 60.12 grams of deionized water. The catalyst was present at the 0.2% level based on resin solids. The formulation had an initial viscosity of 46 seconds, a solids content of 39.8 percent, no organic solvent, a product:curing agent ratio of 85:15 and a pH of 5.5. The formulation had a Gardner 212 appearance color value of 13.

The aqueous formulation was stable at room temperature.

average film weight on each substrate was 12 mg/25.8 cm² (4 sq in).

The coated substrates were subjected to a number of standard tests as seen on Table III to assess the performance of the coatings applied.

The cross cut adhesion test involved scribing an "X" through the coating down to the substrate. No. 610 "Scotch" brand tape was then applied to the coating over the "X" with maximum contact. The tape was then quickly pulled from the coating with a combination tensile and peeling force. No adhesion loss was permissible.

The MEK resistance test involved determing the number of single pass rubs that a cast film coating will withstand before exposure of the substrate occurs when subjected to passage of a soft cotton cloth saturated with methyl ethyl ketone wrapped around an operator's index finger with moderate pressure across the coating surface. The values were highly subjective depending on the operator, but valuable relative data on surface integrity and coating quality were obtained.

The treated aluminum substrate was Amchem 401-45 treated 5052 aluminum; the tin-free steel was U.S. Steel No. 55 tin-free steel, 2CR CT 11 (Box annealed), body stock; the tinplate is U.S. Steel No. 55 electrolytic tinplate (No. .25 tin per base box), body stock.

TABLE III

| A Test Method | | Treated Aluminum | Tin Fre Steel (Uncleaned) | Untreated Aluminum | Tinplate (Uncleaned) |
|---|---|---|---|---|---|
| Cured Film Appearance | Color: | Clear | Clear | Clear | Clear |
| | Tack: | Dry | Dry | Dry | Dry |
| | Flow | Some Small Craters | Some Craters Textured surface | Many Craters, slight dewetting | Many craters, Textured surface |
| Cross Cut Adhesion (CGTM 114) | | Excellent | Excellent | Excellent | Excellent |
| MEK Resistance (Single Rubs | | 480 | 40 | 40 | 50 |
| Fabrication of 303 Can End | (Inside Coated | Pass | Pass | Pass | Pass |
| 303 Can End Immersed 2 Min. in CuSO₄ | (Inside Coated) | Fail (complete film removal) | Fail (moderate darkening under film surface) | Fail (complete film removal) | Fail (severe darkening under under film surface |
| Beer Pasteurization 30 Min.82° C (In Open Container) | Appearance: | No Change (Pass) | No Change (Pass) | Moderate Discoloration | V. sl. discoloration |
| | Adhesion (CGFTM 114): | Excellent | Excellent | Very Poor | Excellent |
| Water Pasteurization 30 Min 82° C (In Open Container) | Appearance: | No Change (Pass) | No Change (Pass) | No Change (Pass) | Some Tack |
| | Adhesion (CGTM 114): | Excellent | Excellent | Excellent | Excellent |
| Steam Processing 90 Min. 121° C: | Appearance: | No Change (Pass) | No Change° | Blushing° | No Change (Pass) |
| Vapor Phase: Water Phase: | Adhesion (CGTM 114): | Excellent | Excellent | Excellent | Excellent |
| | Appearance: | No Change (Pass | No Change° | No Change° | No Change (Pass) |
| | Adhesion (CGRM 114): | Excellent | Excellent | Excellent | Excellent |

°These films could be scratched off with a fingernail immediately after the test was conducted; however, within one hour, the films could not be scratched off.

ture.

EXAMPLE 50

The formulation prepared according to Example 46 was applied using a No. 7, 1.27 cm rod onto four substrates, treated aluminum, tin-free steel (uncleaned) untreated aluminum and uncleaned tinplate. The coated substrates were then subjected to a cure cycle of 10 minutes of 204° C by baking in a forced draft oven. The

EXAMPLE 51

The formulation prepared according to Example 47 was applied to various substrates as described in Example 50. The coated substrates were cured for 10 minutes at 204° C and had an average film weight on each substrate of 12 mg/25.8 cm² (4 sq in).

The coated substrates were subjected to a number of standard tests as seen on Table IV to assess the performance of the applied coatings.

TABLE IV

| Test Method | | Treated Aluminum | Tin Free Steel (Uncleaned) | Untreated Aluminum | Tinplate (Uncleaned) |
|---|---|---|---|---|---|
| Cured Film Appearance | Color: | Clear | Clear | Clear | Clear |
| | Tack: | Dry | Dry | Dry | Dry |
| | Flow: | Some Craters | Many Craters Textured Surface | Many Craters Slight Dewetting | Many Craters Textured Surface |
| Cross Cut Adhesion (CGTM 114) | | Excellent | Excellent | Excellent | Excellent |
| MEK Resistance | | 380 | 110 | 50 | 200 |

TABLE IV-continued

| Test Method | | Treated Aluminum | Tin Free Steel (Uncleaned) | Untreated Aluminum | Tinplate (Uncleaned) |
|---|---|---|---|---|---|
| (Single Rubs) Fabrication of 303 Can End | (Inside Coated) | | | | |
| 303 Can End Immersed 2 Min. In CuSO$_4$ Solution | (Inside Coated) | Fail (complete film removal) | Fail (moderate darkening under film surfact) | Fail (complete film removal) | Fail (moderate under film surface) |
| Beer Pasteurization 30' at 180° F (IN Open Container) | Appearance: Adhesion (CGTM 114): | Mod. Discoloration Excellent | Mod. Discoloration Exceelent | Mod. Discoloration Very Poor | Mod. Discoloration Very Poor |
| Water Pasteurizaton 30' at 180° F (In Open Container) | Appearance: Adhesion (CGTM 114): | No Change (Pass) Excellent | No Change (Pass) Excellent | No Change (Pass) Excellent | Some Tack Excellent |
| Steam Processing 90' at 250° F; Vapor Phase: Water Phase: | Appearance: Adhesion (CGTM 114): Appearance: Adhesion (CGTM 114): | No Change (Pass) Excellent No Change (Pass) Excellent | No Change (Pass) Excellent No Change* Excellent | Blushing* Excellent No Change (Pass) Excellent | No Change (Pass) Excellent No Change (Pass) Excellent |

*These films could be scratched off with a fingernail immediately after the test was conducted; however, within one hour, the films could not be scratched off.

EXAMPLE 52

The formulation prepared according to Example 48 was applied to various substrates as described in Example 50. The coated substrates were cured for 10 minutes at 204° C except that some samples of coated treated aluminum substrates were also cured for 20 minutes at 204° C. The average film weight on each substrate was 12 mg/25.8 cm$^2$ (4 sq in).

The coated substrates were subjected to a number of standard tests as seen on Table V to assess the performance of the applied coatings.

EXAMPLE 53

The formulation prepared according to Example 49 was applied to various substrates as described in Example 50. The coated substrates were cured for 10 minutes at 204° C except that some samples of coated treated aluminum substrates were also cured for 20 minutes at 204° C. The average film weight on each substrate was 12 mg/25.8 cm$^2$ (4 sq in).

The coated substrates were subjected to a number of standard tests as seen on Table VI to assess the performance of the applied coatings.

TABLE V

| Test Method | | Treated Aluminum | Tin Free Steel (Uncleaned) | Untreated Aluminum | Treated Aluminum (20 Min. at 204° C Cure Schedule | Tinplate |
|---|---|---|---|---|---|---|
| Substrate Cured Film Appearance | Color: Tack: Flow: | Sl. Yellow Dry Some Craters | Clear Dry Many Craters Textured Surface | Clear Dry Many Craters, Textured Surface | Mod. Yellow Dry Some Craters | Clear Dry Few Craters |
| Cross Cut Adhesion MEK Resistance (Single Rubs) | | Excellent 740 | Excellent 120 | Excellent 30 | Excellent >1000 | Excellent 90 |
| Fabrication of 303 Can End | (Inside Coated) | Pass | Pass | Pass | Pass | Pass |
| 303 Can End Immersed 2 Min. in CuSO$_4$ Solution | (Inside Coated) | Fail (complete Film removal) | Fail (darkening Under film surface) | Fail (complete Film removal) | Fail (complete film removal | Fail (darkening under film surface) |
| Beer Pasteurization 30': at 180° F (In Open Container) | Appearance Adhesion (CGTM 114): | No Change (Pass) Excellent | Sl. Discoloration Excellent | Mod. Discoloration Very Poor | No Change (Pass) Excellent | V. Sl. Discoloration Very Poor |
| Water Pasteurization 30' at 180° F (In Open Container) | Appearance Adhesion (CGTM 114): | Loss of yellowing Excellent | No Change (Pass) Excellent | V. Sl. Discoloration Excellent | No Change (Pass) Excellent | Tacky Excellent |
| Steam Processing 90' at 250° F; Vapor Phase: Water Phase: | Appearance Adhesion (CGTM 114): Appearance Adhesion (CGTM 114): | No Change (Pass) Excellent No Change (Pass) Excellent | No Change (Pass) Excellent No Change* (Pass) Excellent | Blushing* Excellent No Change (Pass) Excellent | No Change (Pass) Excellent No Change Excellent | No Change (Pass) Excellent No Change (Pass) Excellent |

*These films could be scratched off with a fingernail immediately after the test was conducted; however, within one hour, the films could not be scratched off.

TABLE VI

| Test Method | | Treated Aluminum | Tin Free Steel (Uncleaned) | Untreated Aluminum | Treated Aluminum (20 Min. at 204° C Cure Schedule) |
|---|---|---|---|---|---|
| Substrate Cured Film Appearance | Color: Tack: Flow: | Clear Dry Some Small + Medium Craters | Clear Dry Many Small + Some Medium Craters | Clear Dry Many Craters, Textured Surface | Yellow Dry Some Small + Medium Craters |
| Cross Cut Adhesion MEK Resistance (Single Rubs) | | Excellent 400 | Excellent 160 | Excellent 20 | Excellent >1000 |
| Fabrication of 303 Can End | (Inside Coated) | Pass | Pass | Pass | Pass |

TABLE VI-continued

| Test Method | | Treated Aluminum | Tin Free Steel (Uncleaned) | Untreated Aluminum | Treated Aluminum (20 Min. at 204° C Cure Schedule) |
|---|---|---|---|---|---|
| 303 Can End Immersed 2 Min. in CuSO$_4$ Solution | (Inside Coated) | Fail (complete film removal) | Fail (sl. darkening under film) | Fail (complete film removal) | Fail (complete film removal) |
| Beer Pasteurization 30' at 180° F (In Open Container) | Appearance | No Change (Pass) | No Change (Pass) | No Change (Pass) | No Change (Pass) |
| | Adhesion (CGTM 114): | Excellent | Excellent | Excellent | Excellent |
| Water Pasteurization 30' at 180° F (In Open Container) | Appearance | No Change (Pass) | No Change (Pass) | No Change (Pass) | No Change (Pass) |
| | Adhesion (CGTM 114): | Excellent | Excellent | Excellent | Excellent |
| Steam Processing 90' at 250° F; Vapor Phase: Water Phase: | Appearance | No Change (Pass) | No Change (Pass) | No Change* | No Change (Pass) |
| | Appearance | No Change (Pass) | No Change (Pass) | No Change* | No Change (Pass) |
| | Adhesion (CGTM 114): | Excellent | Excellent | Excellent | Excellent |

*These films could be scratched off with a fingernail immediately after the test was conducted; however, within one hour, the films could not be scratched off.

A number of formulations were made using the procedures of Examples 46 and 47 with modified epoxy resins containing grafted polyethylene oxide. These formulations were coated on treated aluminum according to the method described in Example 50. The coated aluminum panels were cured by heating for 10 minutes at 204° C and the coatings were assessed using the standard tests described in Example 50.

The results of these tests follow. Examples 63 and 64 were cured for 30 minutes at 204° C.

F denotes failure to pass the test.
P denotes the test was passed.
E denotes excellent adhesion in the cross cut, beer and water pasteurization tests and in the treatment with steam.
Y denotes the coating yellowed in the test and,
SY denotes a slight yellowing in the test.

| Example | Formulation Made According to Example | Product From Example | Ratio Product Curing Agent | MEK Rubs 100 Single Pass | Adhesion Cross Cut Test | Beer Past Test 30 Min ° C | Water Past Test 30 Min ° C | Steam Proc. 90 Min ° C | 303 Can 2 Min CuSO$_4$ Soln |
|---|---|---|---|---|---|---|---|---|---|
| 54 | 46 | 22 | 80:20 | F | F | F | F | — | — |
| 55 | 47 | 22 | 80:20 | P | P | P/E | P/E | — | — |
| 56 | 46 | 23 | 70:30 | P | E | Y/E | P/E | P/E | F/P |
| 57 | 47 | 23 | 75:25 | P | E | P/E | P/E | SY/E | P/P |
| 58 | 46 | 19 | 70:30 | P | E | Y/E | P/E | P/E | P/P |
| 59 | 47 | 19 | 75:25 | P | E | Y/E | P/E | SY/E | P/P |
| 60 | 46 | 21 | 70:30 | P | E | P/E | P/E | — | — |
| 61 | 46 | 36 | 70:30 | P | E | P/E | P/E | — | — |
| 62 | 46 | 35 | 70:30 | P | E | P/E | P/E | — | — |
| 63 | 47 | 32 | 70:30 | P | — | — | — | — | — |
| 64 | 47 | 44 | 70:30 | P | — | — | — | — | — |

In MEK test all examples passed except number 54. In all the other examples some value in excess of 100 would be the ultimate MEK rub test value for the particular coatings.

In the beer, water and steam heating tests, the first letter denotes the color and appearance of the coating after the test and the second denotes the adhesion of the coating.

In the 303 can immersion test the first letter denotes the inside coating and the second the outside coating on the can immersed.

EXAMPLE 65

Effect of Epoxy Resin Molecular Weight on Coating Properties

A. Four Epoxy resins essentially differing only in molecular weight were each reacted first with deethanolamine by the method of Example 1. They were then each reacted with ethylene oxide according to the procedure of Example 17. The modified epoxy resins having grafted polyethylene oxide moieties were each extracted by the method of Example 16 to remove any homopolymer of ethylene oxide that might be present.

These four modified epoxy resins were designated:
1. derived from Araldite 6084, molecular weight 1950
2. derived from Araldite GT 7014, molecular weight 1500
3. derived from Araldite 7071, molecular weight 1000
4. derived from Araldite 7072, molecular weight 1250

B. Each of the four modified resins were then formulated by the procedure of Example 46 as seen below:

| | |
|---|---|
| modified epoxy resin | 26.6 parts by weight |
| Beetle 65 (urea-formaldehyde curing agent) | 11.3 |
| deionized water | 62.1 |
| | 100.0 |
| % solids | 38% |
| epoxy: curing agent ratio | 70:30 |

The three formulations were designated:
a. derived from epoxy resin MW 1950
b. derived from epoxy resin MW 1500
c. derived from epoxy resin MW 1000
d. derived from epoxy resin MW 1250

C. Each of the four formulations were then evaluated according to the procedure of Example 50 by coating on Alodine 401 treated aluminum and curing for 10 minutes at 204° C. The properties of the cured coatings were then compared as seen on Table III of the Specification. The results of this comparative testing are shown below:

| | a. | b. | c. | d. |
|---|---|---|---|---|
| Original | | | | |

-continued

| | a. | b. | c. | d. |
|---|---|---|---|---|
| Epoxy MW | 1950 | 1500 | 1000 | 1250 |
| Appearance of film | very slightly yellow | yellow | yellow | yellow |
| Flow | non-tacky blisters and craters | non-tacky blisters and streaking | tacky blisters and craters | tacky blisters and craters |
| MEK 100 Rubs | pass | pass | pass | pass |
| Cross-cut adhesion | excellent | excellent | excellent | excellent |
| Water Pasteurization 30 min., 180° F. adhesion | pass excellent | pass excellent | pass excellent | pass excellent |
| Beer Pasteurization 30 min., 180° F. adhesion | pass excellent | pass excellent | pass excellent | pass excellent |

Conclusions

Coatings c. and d. derived from modified lower molecular weight epoxy resins 3 and 4 respectively produced yellow and tacky cured films. In all other respects their performance was satisfactory and essentially equivalent to the film a. derived from modified resin 1 and to film b. from modified resin 2.

The only essential difference between the various modified epoxy resins is in the differences in the molecular weight of the base epoxy resin first reacted with diethanolamine. The epoxy resins of 1000 and 1250 molecular weight led to tacky cured films while the epoxy resins of 1500 and 1950 molecular weight gave non-tacky cured films.

In commercial use, tackiness is a serious problem which must be avoided. Coated metal sheets are stacked on top of each other and are required to support appreciable weight without sticking together.

In Example 50-53, where higher (1500) molecular weight epoxy resins were used, cured films were always dry exhibiting no tackiness.

The presence or absence of tackiness is clearly associated with the epoxy resin molecular weight. A molecular weight of about 1500 appears to be requisite to prevent tackiness. This differentiates these systems from the lower molecular weight systems of U.S. Pat. No. 2,819,222.

What is claimed is:

1. A process for preparing water-dilutable, heat-curable coating compositions which comprises
   (a) reacting a poly(1,2-epoxide), having a molecular weight in the range of 1,500 to 5,000 with sufficient active hydrogen compound to react with substantially all the free epoxy groups followed by a second reaction with ethylene oxide to form a modified epoxy resin containing in the range of 10 to 90% by weight of grafted and ungrafted poly(ethylene oxide) with less than 20% being ungrafted poly(ethylene oxide),
   (b) adding 5 to 50% by weight of solids of an aminoplast curing agent, and
   (c) diluting with water to bring the total percent solids in the range of 10 to 80% by weight and to yield a stable, aqueous composition containing no particles larger in size than 0.1 micron.

2. A process according to claim 1 wherein the poly(1,2-expoxide) is an aromatic polyglycidyl ether.

3. A process according to claim 2 wherein the aromatic polyglycidyl ether has a molecular weight in the range of 1,500 to 2,000.

4. A process according to claim 2 wherein the aromatic polyglycidyl ether is derived from 2,2-bis(4-hydroxyphenyl)propane or bis(4-hydroxyphenyl)methane.

5. A process according to claim 2 wherein the aromatic polyglycidyl ether is derived from 2,2-bis(4-hydroxyphenyl)propane.

6. A process according to claim 1 wherein the active hydrogen compound are aminoalcohols with primary or secondary amine groups.

7. A process according to claim 6 wherein the active hydrogen compound is diethanolamine.

8. A process according to claim 1 wherein the modified epoxy resin contains 35 to 75% by weight of grafted poly(ethylene oxide).

9. A process according to claim 8 wherein the modified epoxy resin contains 40 to 70% by weight of grafted poly(ethylene oxide).

10. A process according to claim 1 wherein the modified epoxy resin contains less than 10% by weight of ungrafted poly(ethylene oxide).

11. A process according to claim 10 wherein the modified epoxy resin contains less than 5% by weight of ungrafted poly(ethylene oxide).

12. A process according to claim 1 wherein the aminoplast curing agent is present in the amount of 15 to 40% by weight of solids.

13. A process according to claim 1 wherein the aminoplast curing agent is present in the amount of 20 to 30% by weight of solids.

14. A process according to claim 1 wherein the aminoplast curing agent is a methylated urea-formaldehyde resin.

15. A process according to claim 1 wherein the aminoplast curing agent is a methoxy methyl melamine-formaldehyde resin.

16. A process according to claim 1 wherein the aminoplast curing agent is hexamethoxymethylmelamine.

17. A process according to claim 1 wherein the total percent solids are in the range of 30 to 70% by weight.

18. A process according to claim 1 wherein the total percent solids are in the range of 40 to 60% by weight.

19. A process according to claim 1 wherein a poly(1,2-expoxide) which is an aromatic polyglycidyl ether derived from 2,2-bis(4-hydroxyphenyl)propane and having a molecular weight in the range of 1,500 to 5,000 is reacted with two molar equivalents of diethanolamine and then with sufficient ethylene oxide to give a modified epoxy resin containing from 40 to 70% by weight of grafted poly(ethylene oxide) and less than 10% by weight of ungrafted poly(ethylene oxide).

20. A water-dilutable, heat-curing coating composition consisting essentially of the product obtained according to the process of claim 1.

* * * * *